Aug. 20, 1968  A. B. NEWLAND  3,397,855
REAR MOUNT SYSTEM FOR AIRCRAFT ENGINES
Filed Dec. 1, 1966  4 Sheets-Sheet 1
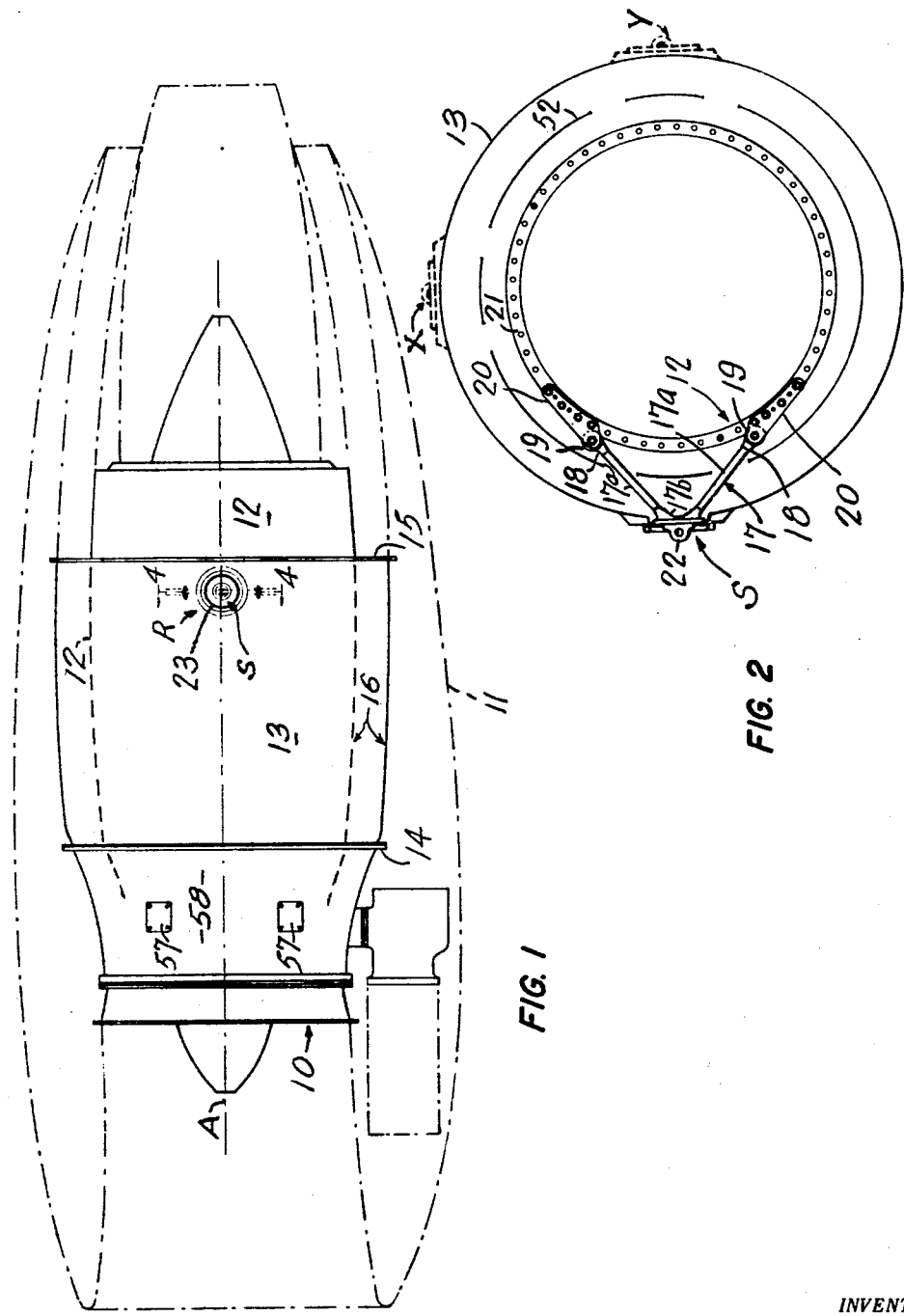
INVENTOR
Allan B. NEWLAND
ATTORNEY Aug. 20, 1968     A. B. NEWLAND     3,397,855
REAR MOUNT SYSTEM FOR AIRCRAFT ENGINES
Filed Dec. 1, 1966     4 Sheets-Sheet 2

INVENTOR
Allan B. NEWLAND
ATTORNEY

Aug. 20, 1968     A. B. NEWLAND     3,397,855
REAR MOUNT SYSTEM FOR AIRCRAFT ENGINES
Filed Dec. 1, 1966     4 Sheets-Sheet 4
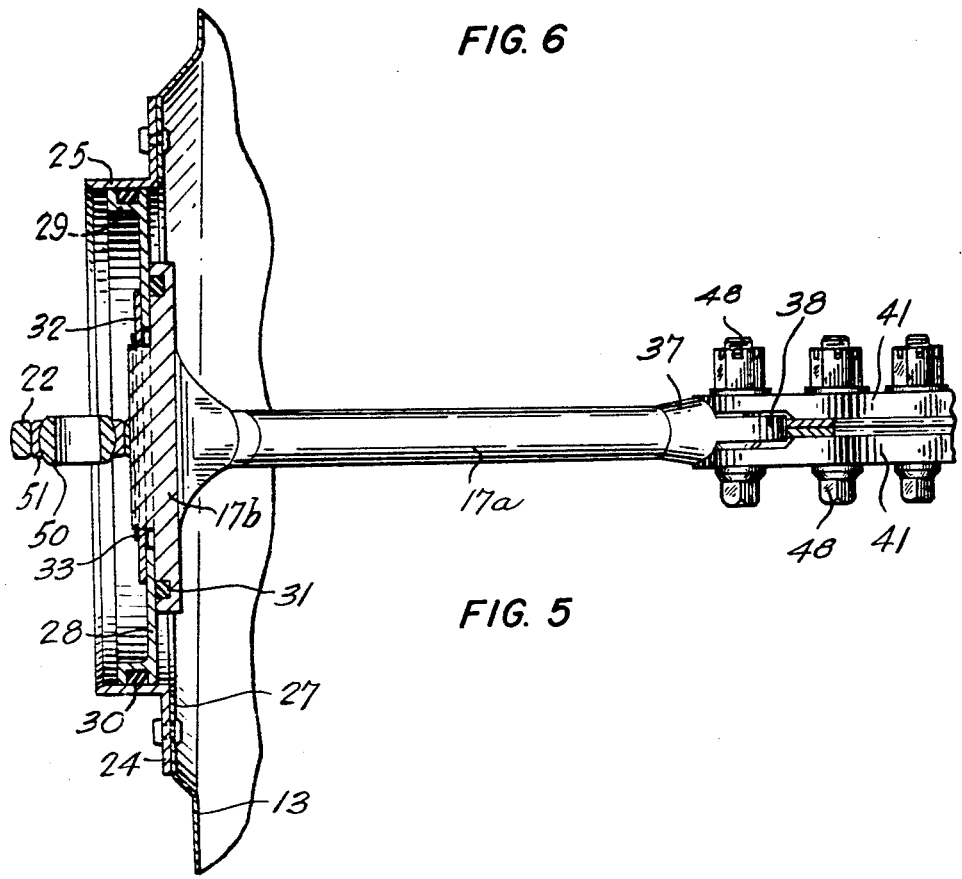
*INVENTOR*
Allan B. NEWLAND
*ATTORNEY*

United States Patent Office 3,397,855
Patented Aug. 20, 1968

3,397,855
REAR MOUNT SYSTEM FOR AIRCRAFT ENGINES
Allan Burrell Newland, St. Lambert, Quebec, Canada, assignor to United Aircraft of Canada Limited, Longueuil, Quebec, Canada
Filed Dec. 1, 1966, Ser. No. 598,373
6 Claims. (Cl. 248—5)

ABSTRACT OF THE DISCLOSURE

A rear mount system for an aircraft engine of the kind having a fan duct wall surrounding and spaced from the gas generator casing. The mount is a wishbone type having ball joints at the junction and ends of the limbs, the junction, including the aircraft mount point, passing through an aperture in the fan duct wall and the space between the junction and the fan duct wall having a seal which allows relative freedom of movement in all directions between the junction and the fan duct wall.

---

The present invention relates to a rear mount system for connecting an aircraft engine to an airframe pickup point and to an aircraft engine fitted with such a rear mount system. The system has particular applicability to an aircraft engine of the turbofan type. In turbofan engines, a portion of the length of the engine is shrouded or enclosed by a surrounding fan duct wall so as to define between the wall and the exterior of the gas generator casing an annular duct used for the purpose of conveying air from the fan stage or stages along part or all of the length of the engine to a propelling nozzle. The fan duct wall is normally of thin sheet material and may be only cantilever mounted from a single flange. It, therefore, does not provide a suitable mounting point for a rear mount system, which requires connection to a structural portion of the engine. At the same time, the most convenient structural portion, which is the gas generator casing, is within the fan duct wall, and, therefore, the wall acts as a barrier to any such mount system leading to problems in its design. Further problems are raised by the undesirability of any gas leak from the fan duct to the exterior atmosphere and the fact that the gases within the fan duct are at an elevated temperature of some 150° to 200° F.

It is therefore an object of the invention to provide a rear mount system for aircraft engines of the turbofan type having an inner structural casing and an outer non-structural shroud surrounding the casing which rear mount system permits the inner structural casing to be attached to the airframe of an aircraft by a member passing through an aperture in the shroud, the aperture in the shroud being sealed to prevent the passage of gas therethrough.

The above problems raised by the presence of the fan duct wall are solved in a simple and ingenious manner in accordance with the invention, but it will be appreciated that the invention has applicability to other types of aircraft engine having certain features in common with turbofan engines, i.e., having an inner structural casing and an outer non-structural shroud surrounding such structural casing and impeding the connection of a rear mount system. The phrase "structural portion" herein refers to rigid static parts of the engine capable of load transmission and sometimes called the prime structure.

The rear mount system of the invention is designed to cooperate with a load-bearing front mounting or support means, which may be of conventional type and will, therefore, not be described in detail.

In accordance with one aspect of the invention, there is provided in combination with an aircraft engine, having a longitudinal axis, an inner structural casing, an outer non-structural shroud surrounding said casing, said engine being adapted to mount load-bearing front support means, a rear mount system comprising:

A wishbone frame of a rigid structural material having a pair of limbs with adjacent ends rigidly interconnected to form a junction, The free ends of said limbs being pivotally mounted to said structural casing and extending substantially tangentially therefrom, A mount point at said junction adapted for pivotal connection to an airframe, Said shroud having an aperture through which said frame extends adjacent said junction with said mount point accessible from outside said shroud, and Means forming a sealing enclosure between said shroud and said frame adjacent said aperture while permitting freedom of movement of said frame relatively to said shroud, in directions radially of said axis and parallel to the surface of said shroud.

The invention also includes the rear mount system above in combination with an aircraft engine having the necessary features already described.

The junction includes a peripheral shoulder extending generally parallel to the surface of said shroud, and said aperture is bounded by a radially directed peripheral flange, said enclosure including:

A plate of generally annular configuration having an inner portion making sliding contact with said shoulder and a peripheral flange forming its outer boundary and making sliding contact with said aperture flange, Sealing rings respectively between said plate and said shoulder and between contacting surfaces of said flanges, and Means for retaining said plate in contact with said shoulder.

Having thus generally described the invention, in order that it may be further understood and put into effect, a preferred embodiment thereof is hereafter described in greater detail with reference to the accompanying drawings, in which:

FIGURE 1 is a side view of a turbofan engine embodying the invention, auxiliary components such as the nacelle being shown in broken lines;

FIGURE 2 is a cross-sectional view of the engine of FIGURE 1, components interior of the gas generator casing having been omitted for the sake of clarity;

FIGURE 5 is a view along the line 5—5 of FIGURE 4; and

FIGURE 6 is a part section along the line 6—6 of FIGURE 4.

Figure 3:
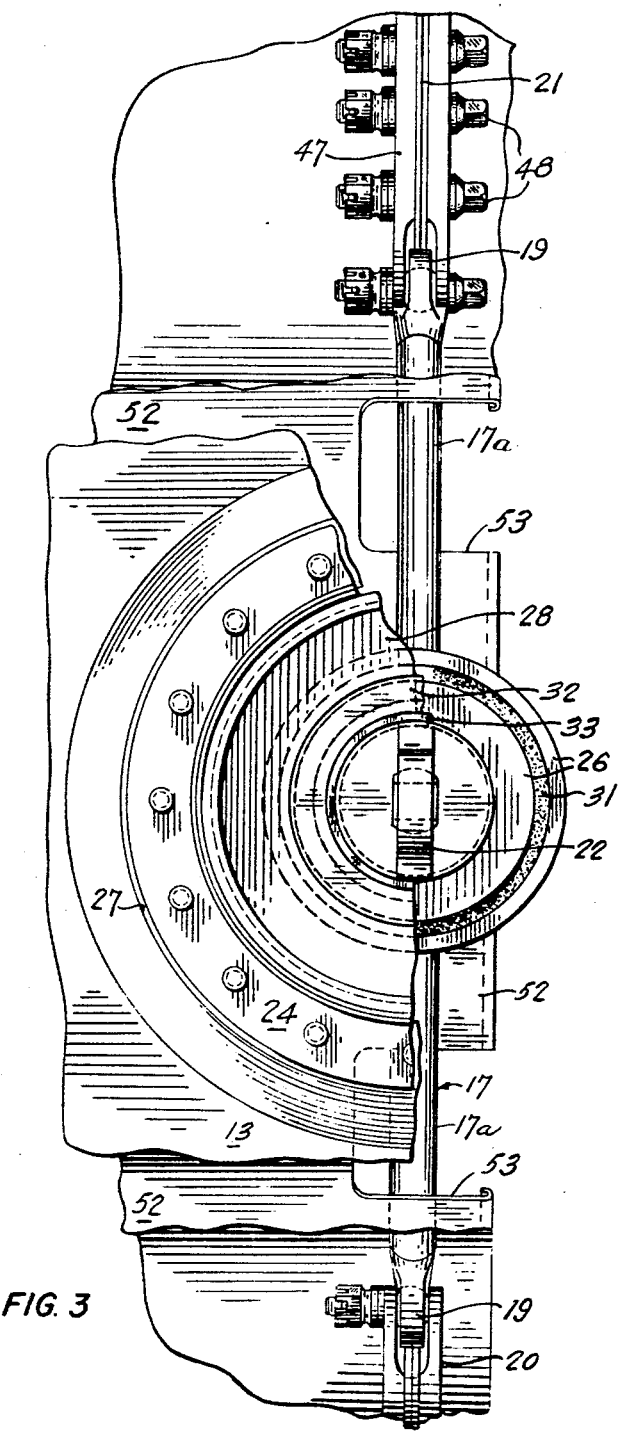
FIGURE 3 is a radially inwardly directed plan view, partly cut away and to an enlarged scale, of the rear mount system of FIGURE 1.

With reference to the drawings, there is shown a turbofan engine 10 surrounded by a nacelle 11 and having a gas generator casing 12 forming the outermost structural portion of the engine. Surrounding the engine over part of its length is a fan duct wall 13, which is cantilever mounted from a flange 14 of the inlet casing 58, the rearward end of the wall 13 being joined to a continuation wall at flange 15. The continuation fan duct wall and other parts not strictly forming part of the engine are shown in broken lines in FIGURE 1. The wall 13 forms an annular fan duct 16 between itself and the exterior surface of the gas generator casing 12, the fan duct wall 13 being composed of thin corrosion resistant aluminum sheeting.

The inlet casing 58 is provided with mounting pads 57 at strong points for the purpose of mounting a conventional pod type front mount which is adapted to take at least a major part of the full load of the engine, so that the rear mount may be a lightweight fastening, the main purpose of which is to restrict oscillation of the rear end of the engine.

The rear mount system of the engine generally indicated at R comprises a wishbone frame 17 having a pair of limbs 17a with adjacent ends rigidly interconnected to form a junction 17b. The free ends 18 of the limbs 17a are mounted through ball joints 19 to couplings 20, which are in turn bolted to a flange 21 of the gas generator casing 12 within the fan duct 16.

The junction 17b terminates radially outwardly of the engine in a mount point 22 in the form of a ring adapted to form part of a ball and socket joint for pivotal connection to an airframe pickup point.

The fan duct wall 13 is formed with an aperture 23 through which the frame 17 extends adjacent the junction 17b with the mount point 22 accessible as shown from outside the fan duct wall 13.

Sealing means generally indicated at S form a sealing enclosure between the fan duct wall and the frame adjacent the aperture 23 while permitting freedom of movement of the frame 17 relatively to the wall 13 in directions radially of axis A and generally parallel to the surface of the wall 13.

Figure 4:
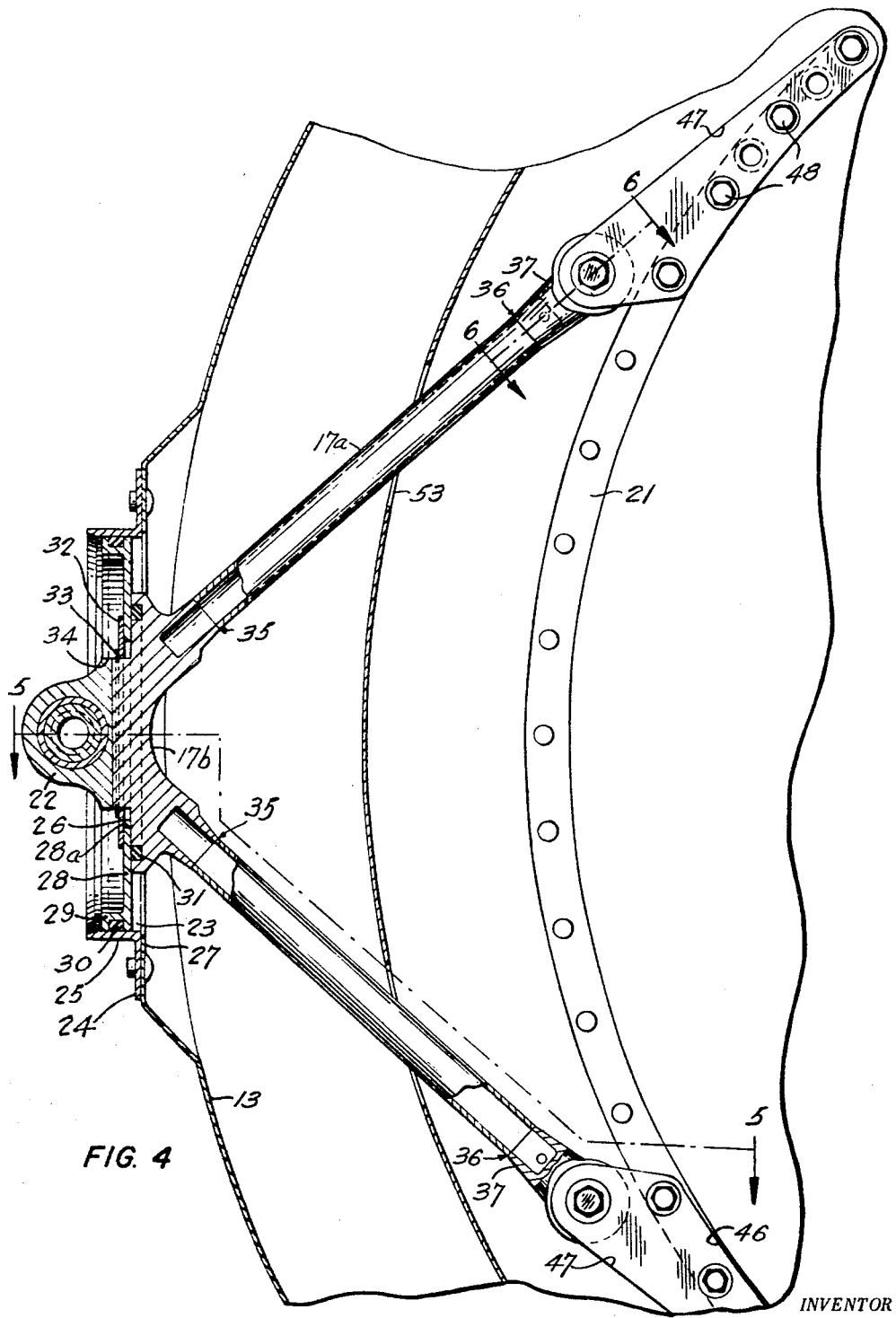
FIGURE 4 is a section along the line 4—4 of FIGURE 1 to the scale of FIGURE 3.

The sealing means S is more clearly shown with reference to FIGURES 3, 4 and 5. Riveted around the edge of the aperture 23 is a collar 24 having a radially outwardly directed flange 25. The junction 17b is provided with an outwardly directed planar annular shoulder 26, extending generally parallel to the surface of the wall 13 which adjacent the aperture 23 is dished to form a flat annular mounting surface 27 for the collar 24. It will be apparent that the flange portion 25 may be pressed integrally from the fan duct wall 13, if desired. Extending between the junction 17b and the flange 25 is a plate 28 of flat annular configuration. An inner interior surface portion of the plate 28 makes sliding contact with shoulder 26. The outer rim of the plate 28 is outwardly turned in the form of a flange 29 which makes sliding contact with the inner surface of the aperture flange 25. Sealing rings 30, 31 are located respectively between the flanges 29 and 25 and between the shoulder 26 and the inner surface portion of the plate 28. The sealing rings 30, 31 should be resistant to corrosion and to the temperature of the gas within the fan duct and may, for example, be of a fluorocarbon resin or of a silicone rubber. The inner edge 28a of the plate 28 defines an aperture of greater diameter than the inner diameter of shoulder 26 and lesser diameter than the outer diameter of shoulder 26, and the outer diameter of the plate is greater than a length consisting of the outer diameter of shoulder 26 plus half the difference between the inner diameters of the plate 28 and shoulder 26, so that the junction 17b is free to move in all directions parallel to the dished portion 27 of fan duct wall 13 without either striking flange 25 or leaving contact at any point with the plate 28.

The plate 28 is held in contact with shoulder 26 by means of a washer 32 and a snap ring 33 seated in the cylindrical inner surface 34 of junction 17b.

Thus, the junction 17b of the frame 17 is free to move parallel to the fan duct wall 13 with respect to the sealing plate 28, and the sealing plate itself is free to move radially inwardly and outwardly with respect to axis A along the inner surface of flange 25.

The limbs 17a and junction 17b, together with the other metal components of the sealing means S, are preferably composed of stainless steel but may be composed of other corrosion and temperature resistant metal. The limbs 17a, as shown more particularly in FIGURE 4, take the form of tubes, welded at 35 to the junction portion 17b and welded at 36 to terminal portions 37.

As shown better in FIGURES 5 and 6, the terminals 37 terminate in ring sockets 38 surrounding a ball 39 and ball washer 40 of a ball and socket joint. The ball 39 is received in contoured inner surfaces of coupling portions 41, the coupling portions 41 and ball 39 being bored to receive a threaded bolt 42 which is secured by washer 43, nut 44, and split pin 45.

The coupling portions 41 are formed as plates having inner longitudinal edges 46 conforming to the contour of the gas generator casing 12 and outer longitudinal edges 47 which are substantially tangential to the outer edge of flange 21. The coupling portions 41 are clamped on opposite sides of the flange 21 over a portion of its length by bolts 48 extending through the flange 21 at points along a circle concentric with the longitudinal axis A of the engine which is preferably the neutral axis of the flange 21, so that transmitted loads meet this neutral axis tangentially, minimizing bending moments in the flange 21.

It will be apparent that while the coupling portions 41 have been shown as separate plates, they may be united by a web along the edge 47 to form a U-shaped coupling member.

As shown, the aircraft mount ring 22 is provided with a ball 50 and ball washer 51 ready for connection to an aircraft pickup point.

The fan duct 16 may contain one or more intermediate baffles or shrouds, one of which is indicated at 52 and apertures or recesses 53 are provided in the shroud 52 for the passage of the limbs 17a.

As shown by reference to FIGURE 2, the wishbone frame 17 is normally provided on only one position around the engine, but may be arranged at any chosen side or in the upper part of the engine as shown by alternative positions X, Y. The fan duct wall 13 may be provided with suitable dished portions at positions X and Y to receive the mount system, and the apertures in the unwanted positions being suitably closed as by closure plates.

It will be apparent that the invention enables a statically determinant mount system to be provided for a turbofan engine or an engine having a similar outer structure and having a swinging link-type of rear mount which is arranged to transfer loads directly from the structural portion or prime structure of the engine, e.g., the gas generator casing, to an airframe mount point, without involving non-structural components or secondary structures, such as the fan duct, in the load path. The invention results in a lightweight, low cost rear mount system which can be used in any type of engine installation, such as aft pod mounted, underslung wing mounted, etc.

The sealing means S at the junction accommodates any misalignments due to tolerance and thermal expansion between the engine and the fan duct wall and between the fan duct wall and the airframe and permits flexibility in the mounting of the fan duct wall. It will be evident that while only a single side mounted wishbone frame need be provided as shown in FIGURE 2, the provision of the wishbone frame in position X of FIGURE 2 will enable a greater loading to be transmitted through the rear mount, and the same will result through the use, if desired, of two such wishbone mountings on opposite sides of the engine.

It will be further evident that many similar modifications may be made within the scope of the invention as defined by the following claims.

I claim:

1. A rear mount system for an aircraft engine of the turbofan type having a gas generator casing, a fan duct surrounding said casing, and forward strong points for load bearing front supports, said system comprising:

a wishbone frame of a rigid structural material, having a pair of limbs with adjacent ends rigidly interconnected to form a junction, the free ends of said limbs being adapted for universal pivotal connection to said casing so as to extend substantially tangentially therefrom, a mount point at said junction adapted for universal pivotal connection to an airframe, said junction being adapted to pass through an aperture in said shroud to allow access to said mount point from outside said junction, said junction having an outwardly facing planar annular shoulder surrounding said mount point and extending normally to the axis of symmetry of the frame, a sealing plate of annular configuration and inner diameter greater than the inner diameter of said shoulder, said plate making sliding contact with said shoulder and extending beyond said shoulder in all directions, and terminating in a peripheral flange adapted to make outward and inward sliding contact with a co-operating flange upon said duct aperture, and means for retaining said plate in sliding contact with said shoulder, said sealing plate being adapted to act as a seal between the interior and exterior of said fan duct and to allow limited freedom of movement of said mount system with respect to said duct, in all directions.

2. The combination comprising:

an aircraft engine of the turbofan type having a longitudinal axis, a gas generator casing, a fan duct surrounding said casing over a portion of the length of the engine and enclosed by a surrounding fan duct wall, forward load bearing mounting and cushioning means connected to said engine and adapted to be connected rigidly to an airframe, and a rear mount system, said system comprising:

a wishbone frame composed of a rigid, non-corrosive structural material, having a pair of limbs with adjacent ends rigidly interconnected to form a junction, means constituting a pair of ball and socket joints, and connecting respective free ends of said limbs to gas generator casing with said limbs extending substantially tangentially therefrom, said junction terminating radially outwardly of the engine in a mount point in the form of a ring adapted to form part of a ball and socket joint for pivotal connection to an airframe, said fan duct wall having an aperture and said frame extending through said aperture adjacent said junction with said mount point outside said wall, said junction comprising an annular peripheral shoulder extending in a plane generally parallel to and level with the surface of said fan duct wall, said aperture being bounded by a radially directed peripheral flange, a sealing plate of generally annular configuration having an inner surface portion making sliding contact with said shoulder, the inner diameter of said sealing plate being greater than the inner diameter of said annular shoulder, and the outer diameter of said plate being greater than a length consisting of the outer diameter of said shoulder plus half the difference between said inner diameters, said plate terminating in a peripheral flange making sliding contact with said aperture flange, sealing rings of heat resistant, non-corrosive material located respectively between said plate and said shoulder and between said flanges, and means for retaining said plate in contact with said shoulder.

3. The combination of claim 2 wherein said gas generator casing comprises an annular peripheral flange, said limb connections each comprising a pair of elongate coupling portions, having inner longitudinal edges conforming to the contour of said casing, said portions being clamped on opposite sides of said flange over a portion of its length by bolts extending through said flange at points along a circle concentric with said longitudinal axis, said portions comprising outer longitudinal edges substantially tangential to the outer edge of said flange, said portions being transversely bored adjacent a common end exteriorly of said flange for receiving coupling bolt means, the centre lines of said limbs extending substantially through the axis of said bore and tangential to said circle.

4. The combination of claim 3 wherein said circle is at the neutral axis of said flange.

5. The combination of claim 4 wherein said limbs are of tubular stainless steel, the free ends terminating in caps each comprising a coupling ring, the ball of each said limb connection lying within said coupling ring and between said coupling members and said members, ball and ring being through-connected by bolt means.

6. In combination with an aircraft engine, having a longitudinal axis, an inner structural casing, an outer non-structural shroud surrounding said casing, said engine being adapted to mount load-bearing front support means, a rear mount system comprising:

a wishbone frame of a rigid structural material having a pair of limbs with adjacent ends rigidly interconnected to form a junction, the free ends of said limbs being pivotally mounted to said structural casing and extending substantially tangentially therefrom, a mount point at said junction adapted for pivotal connection to an airframe, said shroud having an aperture through which said frame extends adjacent said junction with said mount point accessible from outside said shroud, means forming a sealing enclosure between said shroud and said frame adjacent said aperture while permitting freedom of movement of said frame relatively to said shroud, in directions radially of said axis and parallel to the surface of said shroud, said junction including a peripheral shoulder extending generally parallel to the surface of said shroud, and said aperture being bounded by a radially directed peripheral flange, said enclosure including:

a plate of generally annular configuration having an inner portion making sliding contact with said shoulder and a peripheral flange forming its outer boundary and making sliding contact with said aperture flange, sealing rings respectively between said plate and said shoulder and between contacting surfaces of said flanges, and means for retaining said plate in contact with said shoulder.

References Cited

UNITED STATES PATENTS 2,565,733  8/1951  Korsberg _____ 248—5
3,318,554  5/1967  Ward et al. _____ 244—54

JOHN PETO, *Primary Examiner.*